Feb. 27, 1940.  T. R. GAUTIER  2,192,132
TAPE SERVING APPARATUS
Filed Nov. 29, 1938  5 Sheets-Sheet 1

Feb. 27, 1940. T. R. GAUTIER 2,192,132
TAPE SERVING APPARATUS
Filed Nov. 29, 1938   5 Sheets-Sheet 2
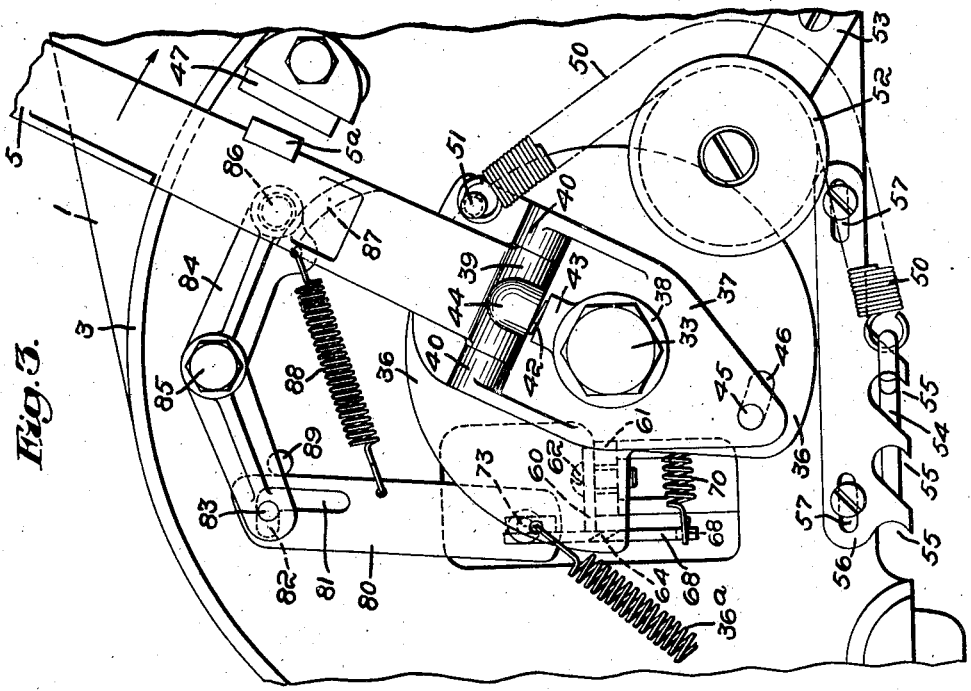
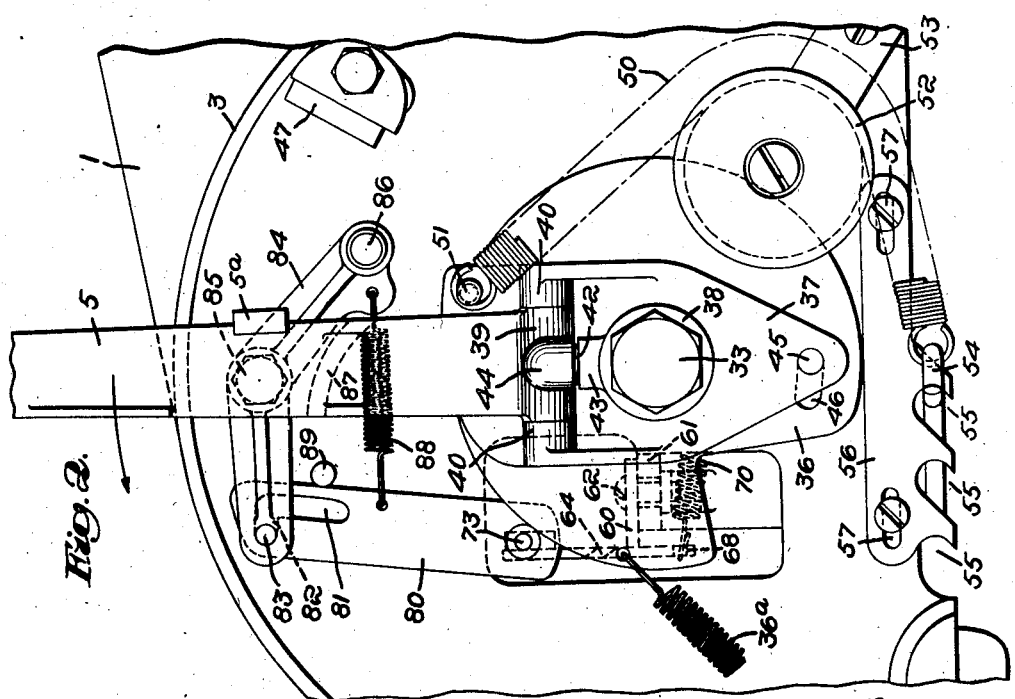
Inventor:
Trevor R. Gautier,
by Emery, Booth, Townsend, Miller & Weidner
Attys

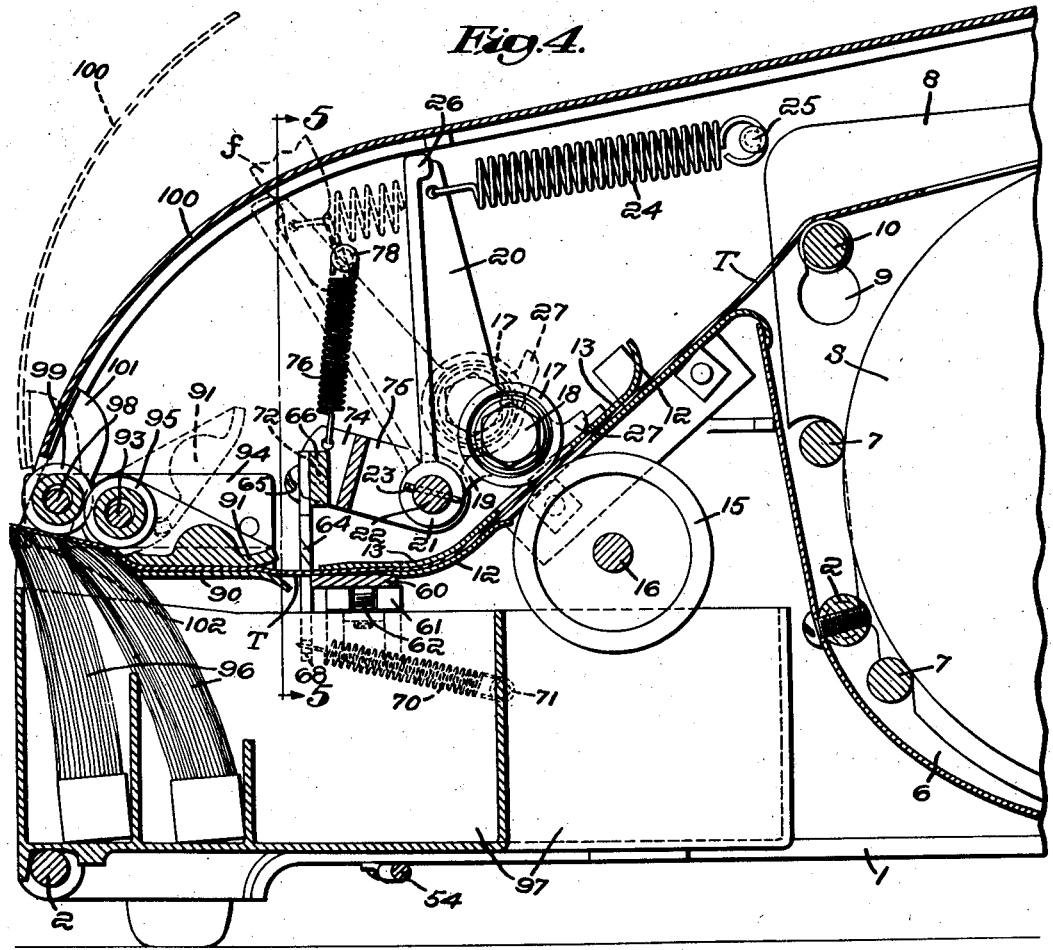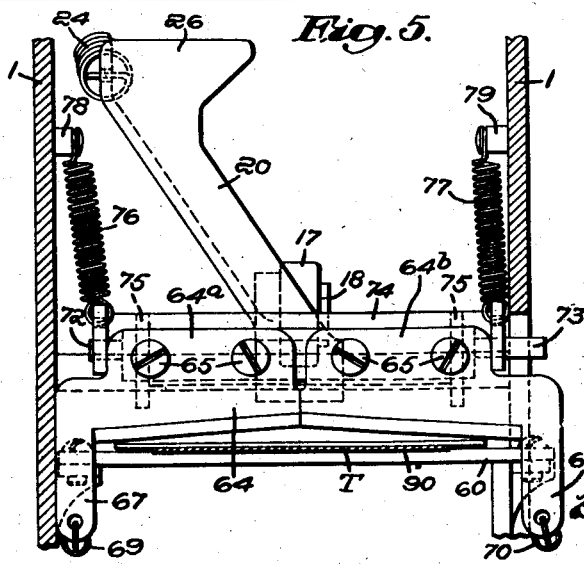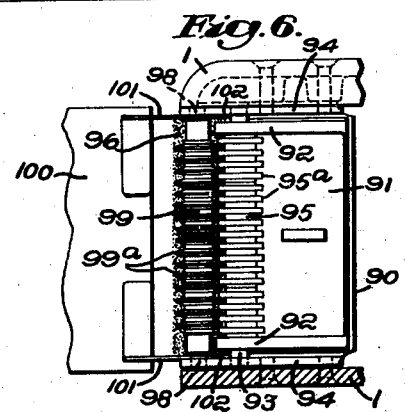

Feb. 27, 1940. T. R. GAUTIER 2,192,132
TAPE SERVING APPARATUS
Filed Nov. 29, 1938 5 Sheets-Sheet 4
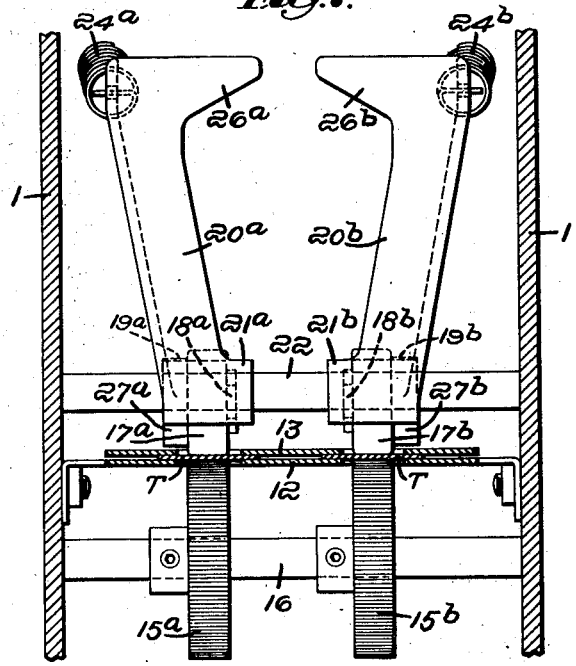
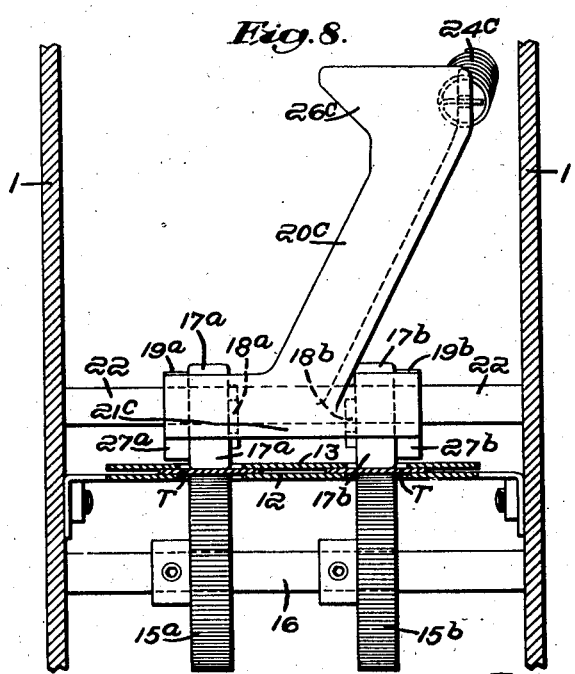
Inventor:
Trevor R. Gautier,
by Emery, Booth, Townsend, Miller + Weidner
Attys Feb. 27, 1940. T. R. GAUTIER 2,192,132
TAPE SERVING APPARATUS
Filed Nov. 29, 1938  5 Sheets-Sheet 5
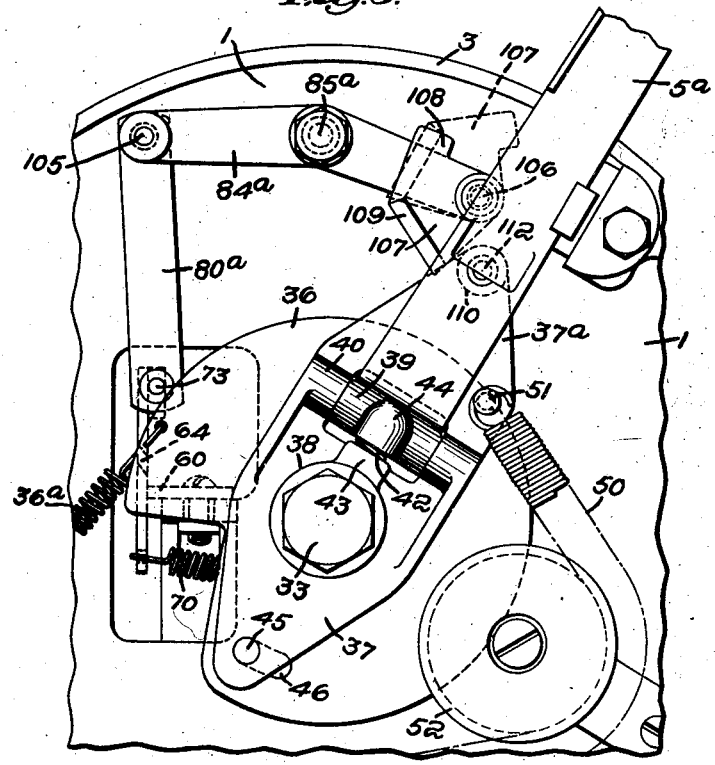
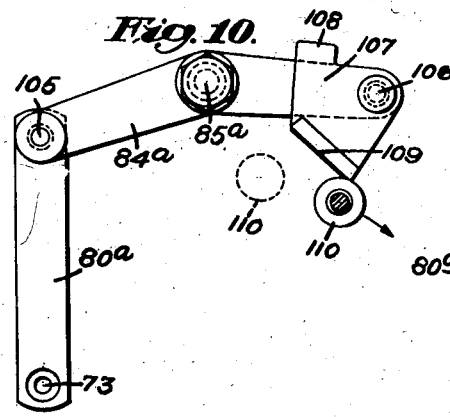
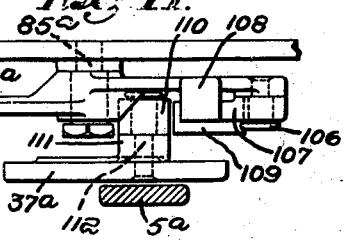
Inventor:
Trevor R. Gautier
By Emery, Booth, Townsend, Miller & Widner
Attys Patented Feb. 27, 1940

2,192,132

UNITED STATES PATENT OFFICE 2,192,132

TAPE SERVING APPARATUS

Trevor R. Gautier, Nashua, N. H., assignor to Nashua Gummed and Coated Paper Company, Nashua, N. H., a corporation of Massachusetts Application November 29, 1938, Serial No. 242,936

17 Claims. (Cl. 164—49)

This invention relates to machines and apparatus for serving or dispensing strip material, particularly gummed tape, in desired lengths and moistened for application in packaging and other uses for which such material as adapted. One machine of this class is shown in my prior Patent 2,082,733, dated June 1, 1937. While my present invention is applicable to this class of machines in general, in various respects it involves improvement upon the apparatus of said patent.

In the drawings illustrating by way of example one embodiment of the invention,

Figs. 2 and 3 are views corresponding to Fig. 1 illustrating different positions of the operating lever and associated parts during forward and reverse movements respectively, parts of the feed gearing being omitted for clearness;

Fig. 4 is a partial longitudinal vertical section centrally through the machine;

Fig. 5 is a vertical cross section as on the line 5—5 of Fig. 4; and

Fig. 6 is a plan, on a smaller scale, of the delivery end of the machine, with the front cover thrown back;

Figs. 7 and 8 are views generally similar to Fig. 5, but taken rearwardly of the movable cutter, showing modifications of the feed roll assembly; and Figs. 9 to 11 illustrate a modified form of the cutter actuating mechanism, Fig. 9 corresponding to the upper portion of Fig. 1, Fig. 10 showing the cutter operating parts in actuated position, and Fig. 11 being a top plan of said parts.

Figure 1:
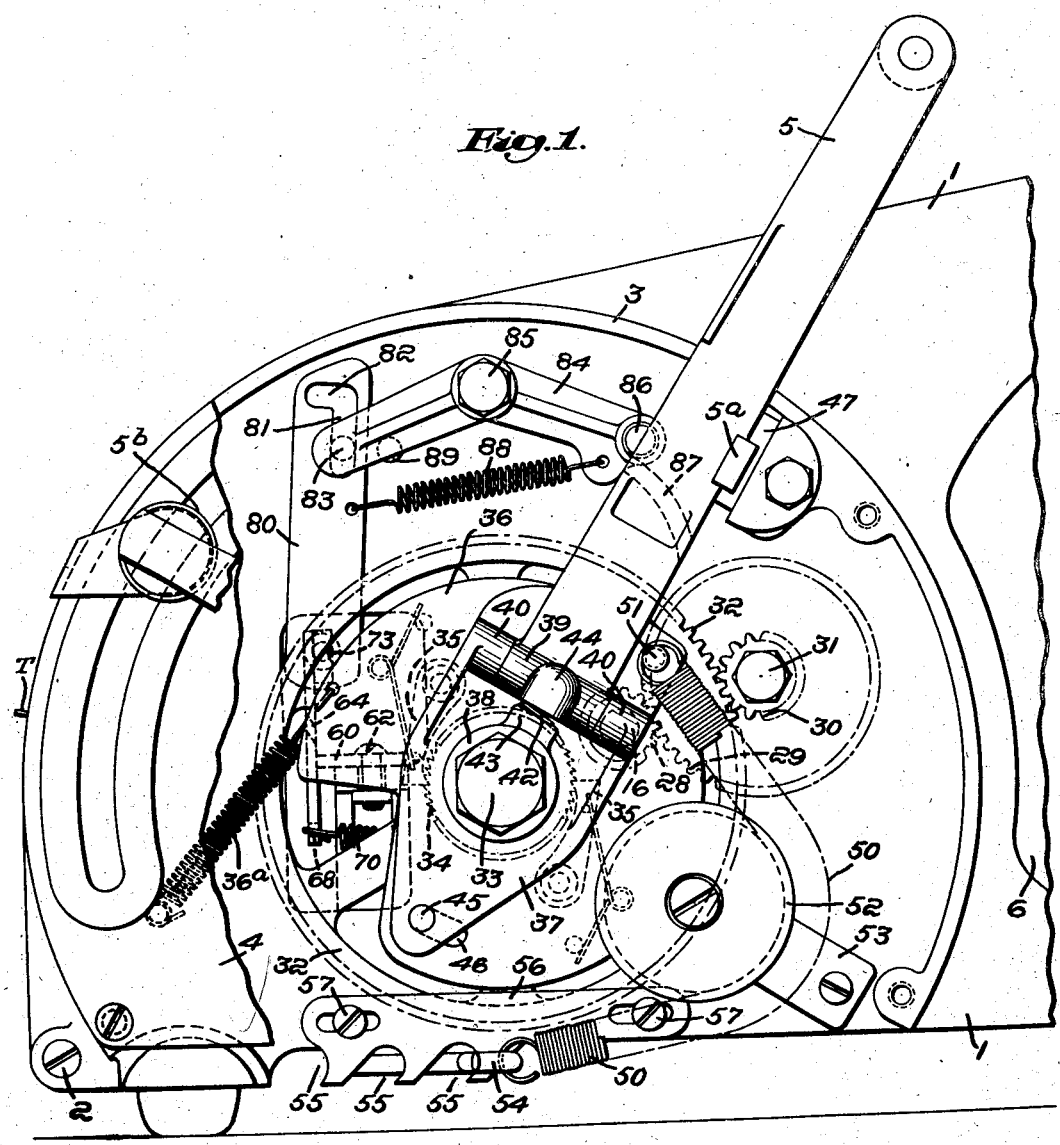
Fig. 1 is a side elevation of the forward portion of the machine, with the side cover plate broken away to expose certain parts of the feeding and cutting mechanisms.

Referring to the drawings in more particular, the machine as a whole comprises a housing including side frames 1 secured in spaced relation as by suitable cross ties, two of which are seen at 2, 2, in Fig. 4. One of the side frames, herein that at the right of an operator facing the machine, is formed with a laterally projecting flange 3, herein of generally circular form, providing a compartment within which the gearing for the feed mechanism and other operating parts are conveniently housed. This gearing compartment is normally closed by a cover plate 4, see Fig. 1, having an inwardly directed flange complementary to the flange 3 on the machine frame and slotted to provide a path for the operating lever 5 between the cover and side frame, in a generally similar manner as in my prior patent above identified.

As seen in Fig. 4, a roll supply S of the strip material to be dispensed, such as gummed paper tape, is supported in a well 6 at the rear of the housing, by means of a series of transverse rollers, two of which are seen at 7, 7 in Fig. 4. The machine is adapted to handle various different widths of tape, the roll supply S being positioned transversely between laterally adjustable guide plates, a portion of one of which appears at 8 in Fig. 4. Keyhole slots 9 in the plates have reduced portions engageable in selected circumferential grooves in cross rods 10, to hold the plates in selected position similarly as in my prior patent. The rod 10 seen in Fig. 4 is rotatably supported between the side frames, adapting it to serve also as a guide for the tape T coming from the supply.

The tape T is led forwardly from the roll supply past the guide 10 and between an elongated under-guide or table 12 and an overlying floating guide or deflector plate 13. The latter may be of a generally similar character as in my patent referred to, said two guides 12 and 13 together providing a throat or feed passage for the tape.

The forward movement of the tape is effected by rotary feed means engageable with its opposite faces. As best seen in Fig. 4, the tape feeding means here includes a lower or inner feed wheel or roll 15 fixed on a shaft 16 rotatably supported between the side frames 1. This lower feed member 15, which is driven by means to be described, is engageable with the under face of the tape, its gummed face, through an appropriate recess in the under guide 12. Opposite said driven feed wheel 15 and in position to engage the top face of the tape through a similar recess in the upper guide or floating plate 13, is a cooperating upper or outer feed wheel or roll indicated as a whole by the numeral 17.

This upper or outer rotary feed element 17 may be of a construction generally similar to that disclosed in my said patent, including an outer annular tire-like member surrounding a stud shaft 18 and having friction-reducing bearing means interposed between it and said shaft. Said stud shaft is carried on a foot or projection 19 at the base of a lever 20 having a bearing collar 21 on a cross shaft 22. Pins 23 hold the lever 20 in position on said shaft accurately to align the upper feed wheel 17 with the lower one.

The upper feed wheel 17 is normally held yieldingly in operative relation with the lower wheel 15, to grip and feed the tape between them, as by a spring 24 having one end attached to the upper end of the lever 20 and its other end secured to the machine framing as at 25. As best seen in Fig. 5, said lever 20 extends upwardly between the side frames to a point where it is readily accessible for engagement by a finger of the operator, as indicated at f, Fig. 4. At its upper end the lever has a finger piece or knob 26 for such engagement.

By thus engaging and depressing the lever the upper feed wheel unit 17 is retracted or lifted away from the under wheel 15 into a position such as represented in dotted lines in Fig. 4. This ready separability of the feed wheels at the will of the operator facilitates threading the tape to and between them when a fresh roll supply is to be installed. Further, this manual retraction of the upper feed unit exposes the underlying parts and permits the floating deflector plate 13 readily to be withdrawn bodily, for inspection or cleaning of the tape guides and associated parts. Release of the finger piece 26 of the lever 20 automatically restores the feed wheels to operative feeding relation. A rearward extension 27 of the foot 19 of the lever 20 acts as a limiting stop for the return of the wheel 17, by engagement with the upper guide plate 13, avoiding injury to the surfaces of the feed wheels when no tape is present between them. Said stop 27 also confines the upper guide or deflector plate 13 against undesired vertical displacement.

Referring again to Figs. 1 and 4, the lower feed roll or wheel 15, fast on its supporting shaft 16, is driven through a train of gearing, preferably and as herein illustrated of a high ratio, of the order of at least about one to ten as between the operating lever 5 and the feed roll 15, in a manner broadly similar to that as disclosed in my prior patent already mentioned. This drive mechanism includes a pinion 28 fast on the lower feed roll shaft 16, which extends outwardly through the righthand frame 1 into the gear compartment. There the pinion 28 meshes with an intermediate gear 29 having fixed on its hub a pinion 30, both rotatably supported on a stud 31. The pinion 30 in turn meshes with a large gear 32 which is fast on a stud shaft 33 on the side frame.

One-way drive connections, herein of the pawl and ratchet type, are provided between the gear 32 and the shaft 33, on the one hand, and the operating lever 5 on the other. These connections include a ratchet wheel 34 also fast on the shaft 33 and adapted to be driven in the forward or feeding direction through one or more spring-pressed pawls 35 pivoted at the inner face of a pawl-carrier or disc 36 which is loosely positioned on the shaft 33.

The connections between the operating lever 5 and the shaft 33 further include a plate or connector piece 37 having a bearing collar 38 for loosely supporting it rotatably on the lever shaft 33. Said piece 37 as illustrated is in effect the base portion of the lever, providing the pivotal mounting for the operating or manual-engaging outer portion of the lever and also being comprised in the connections between the latter and the lever supporting shaft. The lever 5, or its outer portion to be engaged by the operator, is hinged at its inner end, by means of a bearing sleeve 39 receivable between ears 40, 40 on the piece 37 and there supported for rocking movement in the direction laterally of the machine, that is, at right angles to the main path of the lever, as by a pin held in the ears 40. A coil spring 42 bears between a seat 43 on the collar 38 of the connector piece 37 and a boss 44 on the lever. This spring tends normally to urge the lever bodily inward about its transverse pivotal axis provided by said pin.

The operating lever 5 carries a laterally projecting feed stop 5a, for cooperation with one or more adjustable stop elements, such as the stop 5b on the side cover plate 4, Fig. 1, as more fully illustrated for example in said Patent 2,082,733 and also in my Patents 2,066,617, 2,066,618, and 2,066,619, dated January 5, 1937. As herein shown the lever 5 is afforded an action whereby its stop means may be rendered operative or inoperative, by engagement or avoidance of one or more of the cooperable stops or abutments 5b, at the will of the operator, for the purposes of selective feed-length control. Various forms of such feed-length control are disclosed in my said Patent 2,082,733 and claimed in said related patents of January 5, 1937. In the particular example here illustrated the lever itself has capacity for shifting movement, transversely of its main path, by reason of the described movable connections between it and the shaft which supports it, in the general manner as claimed broadly for example in said Patent 2,066,619.

The connector piece 37 is itself operably engaged with the pawl-carrier 36, through a lost-motion connection comprising a pin 45 on one part, herein the piece 37, and a slot 46 in the other, herein the pawl-carrier 36. Hence the latter and the described feed gearing are caused to turn with the operating lever 5 during the greater portion of the forward movement of the lever. During an initial portion of said forward lever movement, however, the described lost-motion connection allows the pawl-carrier 36 and the feed gearing to remain at rest, for purposes to be described. A spring 36a connected to said carrier and to a side frame tends to hold the carrier with its slot 46 in the position relative to the pin 45 on the connector piece 37 as seen in Figs. 1 and 3, so that the pin has the length of the slot for free movement before picking up the pawl-carrier at the start of a forward stroke of the operating lever 5 from its rest position of Fig. 1.

The operating lever 5 is automatically returned to its inactive or rest position as shown in Fig. 1, against a back stop 47 on the frame, by an elongated coil spring 50 detachably anchored at one end on a pin 51 outstanding from the connector piece 37 to which the lever is hingedly attached. This spring is bowed intermediate its ends into a generally U-like form, by bending it around a grooved roller 52 rotatably supported on a bracket 53 on the adjacent side frame 1. Below the roller 52 the spring has its other end removably attached to a hook 54 which is variably positionable lengthwise the machine, said hook being herein pivoted on the frame, in this instance on the side frame remote from the lever, that is, the left side. The hook 54 is adapted to be held selectively in any one of a plurality of downwardly opening notches 55 at the lower part of the frame and formed integrally therein or in a separate element such as the block 56 secured to the right side frame. Said block is shown as adjustable lengthwise the machine as by means of the screw and slot connections with the frame as indicated at 57, 57.

Thus the degree of tension for the lever return spring 50 as a whole may be regulated quickly and conveniently merely by shifting the spring-attaching hook from one notch 55 to another. By bowing or breaking the spring 50 around the roller 52 in the manner illustrated the spring is in effect afforded a compound action and the speed and force of the return movement of the operating lever 5 is more nearly equalized over the entire path of travel of the lever. For relatively short strokes of the lever, such for example as a movement from the rest position of Fig. 1 to the position of Fig. 2 the spring tensioning is largely confined to the upper half of the spring, while during longer strokes the spring tensioning is passed along from the upper portion through the remainder of the spring, thus in effect lengthening the spring and decreasing the total tensioning accordingly.

The tape T is advanced by the described feeding means forwardly through the channel provided between the lower and upper guides 12, 13, to and past suitable means for severing the tape into the desired lengths. The severing means herein comprises a fixed blade 60 horizontally disposed crosswise the machine, in substantial continuation of the under-guide 12, and supported on the side frames as by lugs 61 thereon and on which the blade 60 is detachably held as by screws 62. The front portion of this fixed blade 60 presents a cutting edge for cooperation with a movable blade or cutter, indicated as a whole by the numeral 64, of the guillotine type, adapted to be moved across the path of the tape, herein downwardly from above, to shear the tape. The blade proper 64 may be variously shaped at its cutting edge, and may be formed of one or more parts.

As best seen in Fig. 5, the movable cutter 64 is illustrated in this instance as composed of a plurality of separable units 64a, 64b either and both of which may easily be demounted for sharpening or replacement. The lower cutting edges of said units together form a blade of a shallow inverted V-like formation, giving a progressive cutting action across the tape. Said units are removably secured as by screws 65 to a blade-carrying block 66; see also Fig. 4. At its outer side portions each knife unit 64a, 64b has a depending finger 67, 68 to which are attached springs 69, 70 adjacent the corresponding side frame and secured thereto as at 71, Fig. 4. These springs bias the movable cutter 64 yieldably toward the fixed element 60, insuring a good shearing action. Said depending fingers 67, 68 of the movable blade also act as vertical guides for the latter, in sliding engagement against the front face of the fixed member 60. The movable element is thus confined and guided for movement in a given plane, herein substantially vertical and perpendicular to the path of the tape.

The movable cutter element 64, including the carrier block 66, is pivotally connected, as by pins 72, 73 at the opposite ends of said block, to a supporting yoke 74 of general U-formation as viewed in plan. This yoke in turn is supported by its rearwardly extending arms 75, 75 which are pivoted for vertical movement on the cross shaft 22 previously described in connection with the upper feed wheel 17. Thus the movable cutter assembly as a whole, including the blade or cutter 64 on the carrier block 66 and the yoke 74 has a horizontal pivotal axis provided by the cross shaft 22 but the cutter proper 64 has substantially a straight vertical movement in parallelism with itself, as permitted by the pivot pins 72, 73 connecting its carrier block to the yoke.

Said movable cutter assembly as a whole is normally held up in raised position clear of the tape path, as shown in Figs. 4 and 5. For this purpose I provide springs 76, 77 at the two sides of the machine, attached to the cutter yoke 74 at their lower ends and having their upper ends held on studs or the like on the adjacent side frames, as at 78, 79.

The cutter device is herein operated automatically upon release of the operating lever 5, and in a positive manner but so as to be released substantially instantaneously. Thus it has a very rapid movement across the tape and return, and only momentarily is ever in a position blocking the tape path. This substantially instantaneous cutting and clearing action of the cutter or knife reduces to a minimum any opportunity for jamming of the tape by its engagement with the cutter, such as heretofore sometimes caused by an unintended tape feeding action produced by rebound of the operating lever or by the momentum of the feed gearing and associated parts, continuing their movement after the feed stroke of the operating lever is complete.

Turning now to the mechanism for so actuating the cutter, and referring particularly to Figs. 1 to 3, the supporting pin 73 at the right end of the blade-carrying block 66 is extended outwardly through the side frame 1, as seen in Fig. 5, and is pivoted at its end in a link or cutter actuator 80. This actuator has at its upper end a cam means, herein an angular slotted formation including an elongated vertical portion 81 and a shorter horizontal portion 82. This slot formation receives a pin 83 projecting laterally at the front end of a rock arm 84 pivoted intermediate its ends on a stud 85 on the adjacent side frame. At the rear end of this rock arm 84 is a cam roll 86 adapted to ride on an arcuate cam 87 at the inner face of the operating lever 5. A spring 88 connected at one end to the rock arm 84, rearwardly of its pivot point 85, and at its other end to the actuator 80, draws the latter yieldably toward the rock arm. Rearward movement of the actuator is limited as by a stop 89 on the adjacent side frame.

In the rearward or rest position of the operating lever 5, against its back stop 47, as represented in Fig. 1, the movable cutter, its actuator 80 and the rock arm 84 have the relative positions substantially as there shown. The cam roll 86 is then resting on the highest portion of the cam 87 on the operating lever, that portion most remote from the axis 33 of said lever. The forward or outer end of the rock arm accordingly is depressed, and the pin 83 thereon stands in the vertical portion 81 of the cam slot formation in the actuator.

When the lever 5 is drawn forward by the operator to obtain a length of moistened tape, said operating lever and its connector piece 37 at first move freely, without actuating the feed gearing, by reason of the lost-motion connection 45, 46 already described. During this initial lever movement, the rear end of the rock arm 84 drops under the action of the spring 88 to the position substantially as shown in Fig. 2, the cam roll 86 riding down and off from the cam 87. The forward end of the rock arm 84 accordingly is elevated, carrying the pin 83 up to the level of the horizontal portion 82 of the slot formation in the actuator. The spring 88 accordingly causes the latter to snap rearwardly, bringing the pin 83 into said horizontal slotted portion 82.

This preparatory or cocking movement of the rock arm 84 and cutter actuator 80 positively engages these two elements, providing a positive connection between the rock arm 84 and the cutter element 64 itself. Hence when the rear end of the rock arm 84 is subsequently elevated, by re-engagement of the cam roll 86 with the cam 87 during return movement of the operating lever 5, the actuator 80 is positively moved downwardly, forcing the cutter down across the tape path and shearing the tape.

Said depressed, cutting position of the cutter 64, its actuator 80 and the rock arm 84 is illustrated in Fig. 3. In said figure the operating lever has been released after making its forward stroke, has returned sufficiently to actuate the cutter, and the described cutting operation has taken place. The operating lever has not yet fully completed its return movement, as will be seen by noting its position relative to its back stop 47, but the pin 83 at the front end of the rock arm has already moved back along the horizontal cam slot 82, under the action of the lever cam 87, until it is substantially on the point of re-entering the vertical slotted portion 81.

Hence after a very slight further rearward movement of the operating lever, further depressing the front end of the rock arm 84 and carrying the pin 83 off from the shoulder formed by the lower edge of the horizontal cam slot 82, the actuator 80 and the entire movable cutter unit connected to it at 73 are free to rise, under the action of the cutter return springs 76, 77, Fig. 5, previously described. Thus the movable cutter and its operating parts are substantially instantaneously returned to their initial position of Fig. 1, clearing the cutter from the tape path. The entire severing and return movement of the cutter is extremely rapid, being completed during a fractional part of the total lever return movement. The cutter and its actuator 80 are operatively disconnected from the rock arm 84 before the lever has fully returned into engagement with its back stop 47. Thus any possible rebound of the lever can have no effect on the cutter such as might cause it to obstruct the tape path. But by reason of the described preparatory free movement of the operating lever at the beginning of its next forward stroke the cutter actuating parts are again cocked or operatively engaged, in positively connected relation, in readiness for the next cutting action. Further, the lost-motion connection between the operating lever and its connector piece 37 not only provides for said preparatory positive connecting up of the cutter actuator but also insures that possible lever rebound does not actuate the feed mechanism. In addition, the described cutter connections for effecting a positive but rapid cutting and clearing action insure that the knife is open and the tape path clear at the time of any accidental or unintended feeding of the tape. As previously noted, such unintentional feed may occasionally be caused by the overrunning or momentum of the feed gearing, after the forward or feeding stroke of the lever 5 has been completed and the lever has started its return stroke. Such action is more frequent after the machine has been well broken in and is operated at high speed. The cutting action as herein disclosed is arranged to take place near the end of the lever return stroke, when such excess feed producing momentum generally will have been dissipated, but nevertheless there may be some such remaining effect at times. The described rapid cut-off and instantaneous clearance of the knife from the tape path practically obviates any jamming effect on the tape at such times.

Forwardly beyond the severance point the tape path continues between a bottom guide plate 90 and an overlying deflector or guide plate 91. The latter has lateral bosses or positioning elements 92 at its front portion, see Figs. 4 and 6, for pivoting it on a pin 93 held on the side frames in blocks 94. The pin 93 also serves to support rotatably and with capacity for vertical movement, a roller guide means or element 95 composed of one or more longitudinal units or rollers, preferably of the corrugated or circumferentially grooved form as illustrated. Said rotary guide element 95 constitutes tape presser means adapted to rest by gravity on the upper face of the tape, to cause the latter to pass with its under and gummed face in moistening relation with the underlying moistening means.

As shown in Fig. 4, the moistening means is of the capillary or wick type, including one or more inverted brushes 96, 96 upstanding from a liquid reservoir 97 removably positioned between the side frames 1. The described tape guide means including the deflector plate 91 and guiding presser means 95 operatively associated with the moistener means 96 may be similar to that more fully disclosed and claimed in my copending application Serial No. 115,370.

In the machine of my present invention auxiliary guiding and presser means is provided at the tape delivery point, in advance of the guide element 95. For this purpose a transverse pin 98 is provided at a point beyond the deflector and presser assembly 91—95, said pin being held on the side frames in a forward extension of the side blocks 94. This front pin 98 positions for free rotation a rotary presser or guide element 99, which also may be composed of one or more longitudinal units. As in the guide element 95, the bearing apertures in the roller or roller units of the auxiliary element 99 are of larger diameter than their positioning pin 98, allowing said element to have a vertical floating movement and to rest by gravity on the upper face of the underlying tape.

This supplemental forward guiding and presser element 99 preferably also is formed with a series of circumferential grooves, see Fig. 6, and the positioning pins 93, 98 are so disposed relatively to each other that the two rotary elements 95 and 99 intermesh, their annular ribs 95a and 99a being receivable each in the grooves of the other. The tape contacting portions of the two roller elements are thus brought into close proximity with each other lengthwise the machine, insuring an effective guiding of the tape but with a minimum of frictional resistance thereon. It will also be noted by reference to Fig. 6 that the annular ribs 95a of the rear element 95 have flat circumferential surfaces, of appreciable width, whereas the annular members 99a of the forward roll means 99 are V-shaped in section, having a relatively thin outer edge. Thus I provide in this instance a substantially greater total contact for the rear guide roll means 95, transversely of the tape and at the zone where the gummed face of the tape first comes in contact with the moistening means, than for the forward guide roll means or element 99. In other cases the two roll means may be reversely arranged or may be similar or substantially so, depending somewhat on the character and weight of the tape.

The pin 98 for said forward presser element 99, substantially at the tape delivery point, is further utilized as a pivot support for hinging the forward cover plate 100, Fig. 4. Said cover is adapted to be received on and between the side frames, normally to close in the operating parts at the front portion of the machine. It may extend rearwardly for the full length of the machine or be supplemented by a similar cover part overlying the rear portion of the tape well and pivoted at the back part of the machine frames or housing.

As seen in Figs. 4 and 6, the cover plate 100 has fingers 101 at its lower edge pivotally received on said pin 98, allowing the cover to be swung between its closed full-line position of Fig. 4 and an open position as represented in dotted lines in said figure. The underlying parts are thus readily accessible, for adjusting the tape and for cleaning and inspection purposes, including particularly the deflector plate 91 (noting its dotted elevated position in Fig. 4), the finger lever 20 of the upper feed roll 17, the removable top guide plate 13 and the other associated parts. Said cover 100 is not fully opened in its dotted position of Fig. 4 and may be swung forwardly, substantially into a horizontal position, until held by shoulders 102 on the cover-supporting fingers coming into engagement with the inner pin 93 already described and which accordingly may have this additional cover positioning function; Fig. 6.

In Figs. 7 and 8 I have shown rotary feed means adapted for dispensing a plurality of tape lengths, from a like number of tape supplies. The views are taken on a line just behind the cutter mechanism, see Fig. 4, down to the tape chute and perpendicularly through the latter, looking toward the rear. Parts not otherwise referred to may be the same as in the previous figures.

Referring now to Fig. 7, the lower and upper guides 12 and 13 provide a feed throat as in the previous example. The driven shaft 16 has fixed on it rotary means, unitary or otherwise, for feeding a plurality of different tapes T, two in this instance. Said rotary means as here shown comprises separate feed wheels or rolls 15a and 15b spaced for engaging the under faces of the tapes T, through corresponding apertures in the lower guide 12. The upper guide 13 is similarly apertured for a like plurality of upper or outer rotary feed elements, wheels, or rolls 17a and 17b in line with the lower wheels 15a and 15b respectively. Said upper feed wheels 17a, 17b individually may be the same as previously described in connection with Figs. 1 to 6, each having a supporting stud 18a, 18b on corresponding feet 19a, 19b at the base of the levers 20a, 20b.

In the example of Fig. 7, the upper feed wheels are adapted to be lifted independently, to move them bodily away from the paths of the tapes, for the purposes described in connection with the earlier figures, referring particularly to Figs. 4 and 5. The levers 20a, 20b accordingly are loosely mounted by means of their bearing collars 21a, 21b for rocking on the cross shaft 22 on the side frames 1, 1, being held in position lengthwise the shaft by any suitable means such as pins or the like. The upper feed wheels 17a, 17b normally are held yieldingly in operative relation with the corresponding lower wheels 15a, 15b as by springs 24a, 24b, similarly as in the earlier single-feed example. Stops 27a, 27b on the lever feet 19a, 19b limit the in-movement of said upper wheels, also as in said earlier example.

The individual release levers 20a, 20b extend up between the side frames for convenient access by the operator, and each has at its upper end a finger piece or knob 26a, 26b for manipulating it to lift the corresponding upper feed wheel 17a or 17b independently. Said levers and their finger pieces may be substantially the same, or arranged as left and right members in a manner as illustrated in Fig. 7.

In the embodiment of Fig. 8, a plurality of lower and upper feed wheels is provided, similarly as in Fig. 7, corresponding reference numerals being used for like parts. In this instance, however, the plurality of upper wheels is arranged to be lifted simultaneously for separation from the under rotary means, by a single manipulating or release lever 20c, acted on by its spring 24c, and having a finger piece 26c. At its lower portion said lever 20c has a single elongated bearing collar 21c whereby it is supported for rocking movement on or with the cross shaft 22. The wheel-supporting rearward projections 19a, 19b are both integral with said collar 21c. Thus a manipulation of the common lever 20c, similarly as explained in connection with Fig. 4, serves to lift the plurality of upper wheels 17a and 17b together.

An arrangement with independent control of the plural upper feed wheels, as in Fig. 7, is desirable for certain types of installations, particularly where different weights or other character of tape is to be dispensed by the plural feed units. In other cases a simultaneous control for the upper wheel release is preferred, for example, where the machines are in practically constant use and hence require more frequent replenishment of the tape supplies.

Also, both lower feed wheels need not operate at the same time but may be controlled by separate operating levers such for example as those of my Patent No. 2,099,647 dated November 16, 1937. The illustrated examples of Figs. 7 and 8, wherein plural lengths of tape are fed simultaneously are particularly useful for shipping rooms and similar points where the packages or other objects to be taped require several pieces of tape of the same length, as for transverse application to more or less elongated parcels, packages, boxes and the like.

Turning now to Figs. 9 to 11, I have there shown a modified form of cutter actuating mechanism. Here also, parts not otherwise referred to may be the same as in the preceding figures.

In this instance the cutter actuator or link 80a has a fixed pivotal connection as at 105 with the forward end of the rock arm 84a pivoted at 85a on the side frame 1. On the rear portion of the rock arm 84a there is pivotally attached, as at 106, a movable or shifting cam member 107 having at its upper part a lateral finger 108 extending across above the rock arm and cooperable with the latter to limit the downward or counter-clockwise pivoting movement of the cam 107 relative to the rock arm, operatively to position said cam. Below its pivot 106 the cam member has a cam proper 109, of a width for cooperation with a cam roll 110.

This cam roll 110 is supported for movement with the operating lever 5a, in this instance on an upward extension 37a of the base portion or connector piece 37 of the lever, which otherwise may be constructed and arranged as previously described. Said extension 37a has a boss 111 at its inner face, see particularly Fig. 11, receiving a stud 112 on which the cam roll 110 is rotatably supported, at a level for cooperation with the cam 109 of the cam member 107.

In Fig. 9 the operating lever is shown in its normal or rest position, at the rear limit of its path. The cam roll 110 then stands behind the variably positionable cam member or element 107, as seen in said figure. At the start of a forward stroke of the operating lever, and during its initial inactive or non-feeding motion in the forward direction, the cam roll engages the rear face of the cam member 107, elevates it, as represented by the dotted line position of the latter in Fig. 9, and passes forwardly beyond it as the lever continues its forward motion. The cam member thereupon automatically again drops to its full line position of Figs. 9 and 10. Such forward position of the lever, with the cam roll 110 ahead of the cam member is shown in Fig. 11, and by the dotted representation of the cam roll in Fig. 10.

During return movement of the operating lever 5a and its base piece 37, 37a, the cam roll 110 thereon engages the cam face 109 of the cam member 107, thrusting against the latter substantially radially of its pivot point 106 and hence forcing the cam member and the rear portion of the rock arm 84a upwardly. The front end of the rock arm accordingly is depressed, moving the cutter actuator 80a downwardly as shown in Fig. 10. This causes the movable blade to sever the tape, the actuator being pivotally connected at its lower end, as at 73, to the cutter carrier or block, similarly as in the embodiment of Figs. 1 to 6. This actuation of the cutter is a positive and rapid action and the cutter and its actuator are substantially instantaneously released, quickly clearing the tape path as described in said earlier instance, the cam roll 110 passing off rearwardly from below the cam member 107 and resuming its position behind the latter, as in Fig. 9, during the latter portion of the operating lever return movement. In Fig. 10 the cam roll 110 is shown at the instant of riding out rearwardly from engagement with the cam member during said lever return.

My invention is not limited to the particular embodiments thereof illustrated and described herein, and I set forth its scope in my following claims.

I claim:

1. In a tape dispensing machine, in combination, a frame, a support for a tape supply, tape feeding means including an operating lever having forward and return movements, a cutter movable across the tape path to sever the tape, a cutter actuator to effect said movement of the cutter, a rock arm having a movable connection with said actuator positively to engage or to release the latter, and means on the operating lever engageable with said rock arm, to move the latter into operative engagement with the actuator during the first part of the forward movement of said lever, and to actuate the cutter and immediately release it and said actuator during the return movement of the operating lever.

2. A tape dispensing machine comprising, in combination, a frame having a tape supply support, rotatably mounted tape feed wheels, an operating lever having forward and return motions, one-way drive mechanism between the lever and one of said feed wheels to actuate the latter during forward motion of the lever, said mechanism including means whereby the lever has an initial forward movement free of the feed wheels, a movable cutter for the tape, and positive connections between the lever and the cutter having actuating and released positions, said connections assuming their actuating position during said initial forward movement of the lever and being actuated to cut the tape and to return to released position as the lever returns.

3. In a tape dispensing machine having a frame and a support for a tape supply, tape feeding means having an operating lever, a cutter blade movable in a plane perpendicular to the feed path of the tape, a blade supporting yoke pivotally mounted on the frame and having pivotal connection with the blade, spring means normally holding the blade clear of the tape path, a blade actuator also pivotally connected with the blade, a rock arm on the frame cooperable with the actuator to give it a blade actuating movement or to release it, and cam connections between the operating lever and said rock arm whereby the rock arm and actuator are conditioned for blade actuation during movement of the lever in one direction and effect such actuation and instantly release the actuator and blade during opposite movement of the lever.

4. In a tape dispensing machine having means to feed the tape from a supply, a cutter blade movable across the path of the tape to sever it, a yoke element pivotally supported on a fixed horizontal axis spaced from the tape path in the direction perpendicular to it, means pivotally supporting the cutter blade on said yoke element on an axis paralleling that of the latter to permit rectilinear movement of the blade to and from the tape path during pivotal movement of the yoke, and means to actuate the blade.

5. In a tape dispensing machine, the combination according to claim 4 wherein the yoke pivot is vertically above the tape path, and including spring means for normally retaining the yoke and blade in, and returning them to, elevated position clear of the tape path.

6. In a tape dispensing machine, a frame, a support for a tape supply, feeding and severing means for the tape, an operating lever pivotally supported for swinging movement on the frame in forward and reverse directions, and operating connections between the lever and the feeding and the severing means whereby the lever actuates the feeding means during forward movement, the severing means during reverse movement, and has an initial non-feeding action at the start of its forward movement.

7. In a tape dispensing machine having a frame and a support for a tape supply, tape feeding means having an operating lever, a cutter blade movable in a plane perpendicular to the feed path of the tape, a blade supporting yoke movable on the frame and having operative connection with the blade, spring means normally holding the blade clear of the tape path, a blade actuator also operatively connected with the blade, a rock arm on the frame and engageable at one end with said actuator, a variably positionable cam element movably supported at the other end of the rock arm, and cooperable means movable with the operating lever and adapted to shift the cam element so as to pass it during a first part of the movement of the lever in one direction and to engage said element and thereby effect blade actuation during the opposite movement of the lever, said cam element being automatically positioned for such engagement during completion of the lever movement in the direction first mentioned.

8. Tape dispensing mechanism according to claim 7 wherein the cam element is pivotally hung on the rock arm and has positioning means engageable with the latter to present the cam element for actuating engagement by the operating lever.

9. In a tape dispensing machine, in combination, a frame, a support for a tape supply, tape feeding means including a hand operating member having forward and return movements, a cutter movable across the tape path to sever the tape, cam means moving with the operating member, an actuating element connected to and vertically movable with the cutter, a pivoted element including front and rear arms, the rear arm being disposed for operative engagement by said cam means, a vertically elongated slot formation on the cutter actuating element, the front arm of said pivoted element being received in said slot formation and having downwardly effective operative engagement therein with said actuating element, said cam means and said actuating and pivoted elements having rapid positive actuation during return movement of the operating member and being immediately interreleased to insure prompt clearance of the cutter from the tape path.

10. A tape dispensing machine comprising, in combination, a housing including a tape supply support, tape feed means, a manual operating element having forward and return motions, one-way drive mechanism between said element and the feed means to actuate the latter during forward motion of the manual element, a vertically rectilinearly reciprocable cutter for the tape, means in the housing to support and guide the cutter for said reciprocation, and cutter actuating means interposing the manual element and the cutter and including an upright member, a vertically movable lever member on the housing for engaging with the upright member and with a contact member moving with the manual operating element, said members having operatively effective and released relative conditions and being caused by the manual operating element to assume their operatively effective relative condition during a preparatory first portion of the forward feeding movement of the latter and being substantially instantaneously actuated to cut the tape and to return to their relatively released condition as said manual element returns.

11. In a tape dispensing machine, in combination, a frame, a support for a tape supply, tape feeding means including an operating lever having forward and return movements, a cutter movable across the tape path to sever the tape, an upright actuating connector to effect said movement of the cutter, a lever arm pivoted on the frame for rocking motion and having movable engagement with said connector affording a preparatory relative movement between them and a cutter-actuating movement of the two together, and means moving with the feed operating lever and engageable with the pivoted lever arm to effect said preparatory movement during a first part of the forward movement of said feed operating lever and to actuate the cutter and immediately release it and said connector during the operating lever return movement.

12. Tape dispensing mechanism comprising a frame housing a support for a tape supply and a guide flooring leading forwardly therefrom, tape feeding means also housed by the frame including a pair of feed wheels, pawl and ratchet mechanism and a drive element to rotate one of the wheels in the direction to advance the tape between them, a blade carrier device including a transverse supporting member and a connected upright member having an elongated vertical slot, a cutter blade fixed to said supporting member, means mounting said carrier device on the frame for vertical rectilinear movement, an operating lever for said device pivoted on the frame and having an end portion loosely engaged in said slot, an extension of said lever projecting away from the vertically slotted member, and a lever operating element moving with said drive element of the tape feeding means and engageable with said extension.

13. In a tape dispensing machine, a frame providing a support for a tape supply, means on the frame extending forwardly from said support to afford a guide table for the tape including front and rear table portions having a transverse slot between them, a blade carrier element extending transversely of the tape guide table and mounted on the frame for vertical rectilinear reciprocating movement, a blade having a cutting edge directed toward said slot, means demountably attaching the blade to said carrier element for rectilinear movement through said slot in the table and return, spring means normally holding the carrier element in a position with the blade away from said slot, rotary feed means for the tape including one-way drive mechanism therefor, and means operatively interposing said drive mechanism and the blade carrier element to move the latter toward said slot upon operation of said drive mechanism in only one direction thereby to sever that portion of the tape opposite said slot.

14. In a tape dispensing machine, a frame providing a support for a tape supply, longitudinally extending means on the frame affording a guide table for the tape including front and rear table portions having a transverse slot between them, means including rotary feed wheels to advance the tape along the guide table and across said slot, a blade carrier element extending transversely of the tape guide table and mounted on the frame for vertical rectilinear reciprocating movment, a guillotine-like blade having a downwardly directed cutting edge with portions disposed at an angle to each other, means demountably attaching the blade to said carrier element for rectilinear movement downwardly through said slot in the table and return, spring means normally holding the carrier element in a position with the blade above said slot, and lever means operatively available following a tape advancing operation to depress the blade carrier element and blade to cut the tape opposite said slot for delivery of the severed portion at the front end of the guide table.

15. In a tape dispensing machine, a frame providing a support for a tape supply, a guide table for the tape having a transverse slot intermediate its ends, a cutter device mounted on the frame for vertical rectilinear movement and including a transverse supporting member and a blade fixed thereon with its cutting edge disposed toward said slot, spring means acting normally to move the cutter device to position the blade away from the slot of the tape guide table, and actuating means periodically to move the cutter device in the direction for severing the tape opposite the slot and then quickly to release said device for return to normal position away from the slot, said actuating means including an upright element connected to the blade-supporting member of the cutter device, and associated vertically movable actuating lever mechanism having a preparatory movement without moving the cutter device and such that subsequent movement and release of the actuating lever mechanism effect respectively a positive tape-severing movement of said cutter device and an immediately following release thereof.

16. In a tape dispensing machine, a housing including opposed spaced side members, a blade carrier extending transversely between said side members, a cutter blade mounted on said carrier, means on the side members positioning the blade carrier for rectilinear vertical movement in the housing, spring means constantly urging the carrier and blade to a normal inactive position, an upright member connected to the carrier and having in it an elongated slot, an operating lever movably carried by the housing and having a portion loosely engaging in said slot, a hand actuating lever supported on the housing for rotary movement in one and the opposite directions, a tripping element moving with said hand lever, an extension on the carrier operating lever disposed in the path of said tripping element, engagement of said extension by the tripping element upon rotary movement of the hand lever in one direction being effective to move the operating lever in said slot without movement of the carrier, and reverse engagement between the tripping element and said extension during rotary movement of the hand lever in the opposite direction acting to shift said carrier operating lever and simultaneously to move the carrier and its blade to active tape-severing position, and spring means connected between the housing and the hand lever and constantly urging the latter in said opposite direction.

17. In a tape dispensing machine, in combination, a frame, a support for a tape supply, tape feeding means including an operating handle having forward and return movements, a guillotine-like cutter blade having a normal position above the tape path and guided for rectilinear vertical movement downwardly across the tape path and return, a rock lever pivoted on the frame, an actuator positively connected to the cutter blade and having a vertically elongated slot formation movably receiving a forward portion of said rock lever, spring means normally urging the cutter blade and actuator upward, cam means moving with the operating handle and operatively engageable with a rear portion of the rock lever, the tape feeding means also including connections affording an initial non-feeding forward movement of the operating handle during which there occurs a preparatory vertical movement of the rock lever relative to the cam means and to the slotted actuator, said cam means and said rear portion of the rock lever being shaped and positioned for operative interengagement in the course of the handle return movement thereby substantially instantaneously to throw down said forward portion of the rock lever and the cutter blade actuator engaged thereby and then quickly to free the latter and the cutter blade for restoration by the spring means to normal elevated position.

TREVOR R. GAUTIER.